United States Patent [19]

Green et al.

[11] 4,422,799

[45] Dec. 27, 1983

[54] METHOD FOR INSTALLING SUBMARINE PIPELINES USING A MARINE RAILWAY SYSTEM

[75] Inventors: William L. Green, New Orleans; Dennis E. Calkins, Metairie; Gary E. Harrison, Marrero, all of La.; Jesse R. Wilkins, Picayune, Miss.

[73] Assignee: McDermott Incorporated, New Orleans, La.

[21] Appl. No.: 268,557

[22] Filed: Jun. 1, 1981

[51] Int. Cl.³ .............................................. F16L 1/00
[52] U.S. Cl. .................................. 405/158; 405/136; 405/168; 405/169
[58] Field of Search ................ 405/158, 136, 159–167

[56] References Cited

U.S. PATENT DOCUMENTS

| | | | |
|---|---|---|---|
| 1,363,115 | 12/1920 | Helfrich | 405/136 X |
| 1,393,943 | 10/1921 | Chapman | 405/166 |
| 1,603,106 | 10/1926 | Fetty et al. | 405/158 |
| 1,647,448 | 11/1927 | Jones | 405/159 X |
| 1,852,796 | 4/1932 | Bennett | 405/174 X |
| 3,012,406 | 12/1961 | Lassen-Nielsen | 405/136 |
| 3,133,421 | 5/1964 | Lamy et al. | 405/158 |
| 3,431,740 | 3/1969 | Lamy | 405/165 |
| 3,514,962 | 6/1970 | Poole | 405/170 |
| 3,533,244 | 10/1970 | Shaw | 405/158 |
| 3,595,312 | 7/1971 | Matthews | 405/168 |
| 3,616,651 | 11/1971 | Chang et al. | 405/158 |
| 3,640,080 | 2/1972 | Neal | 405/168 |
| 3,690,112 | 9/1972 | Pattison et al. | 405/169 |
| 3,934,647 | 1/1976 | Bokenkamp | 405/168 |
| 3,950,955 | 4/1976 | Meetes | 405/158 |
| 4,117,692 | 10/1978 | Oberg | 405/166 |
| 4,225,270 | 9/1980 | Dareing | 405/168 |

FOREIGN PATENT DOCUMENTS

| | | |
|---|---|---|
| 280938 | 7/1928 | United Kingdom . |
| 1444037 | 7/1976 | United Kingdom . |
| 2011011 | 4/1979 | United Kingdom . |
| 1582116 | 12/1980 | United Kingdom . |

Primary Examiner—Dennis L. Taylor
Attorney, Agent, or Firm—Robert J. Edwards; J. Henry Muetterties; James C. Simmons

[57] ABSTRACT

A method of installing a cold water conduit for use with Ocean Thermal Energy Conversion (OTEC), fossil or nuclear power plants. The method is comprised of installing a marine railway system on the ocean floor and subsequently using the railway system as an aid to the installation of the cold water conduit and as a support structure for the conduit.

11 Claims, 26 Drawing Figures

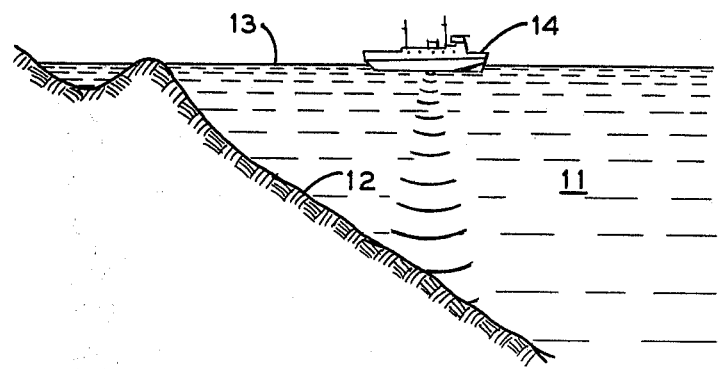
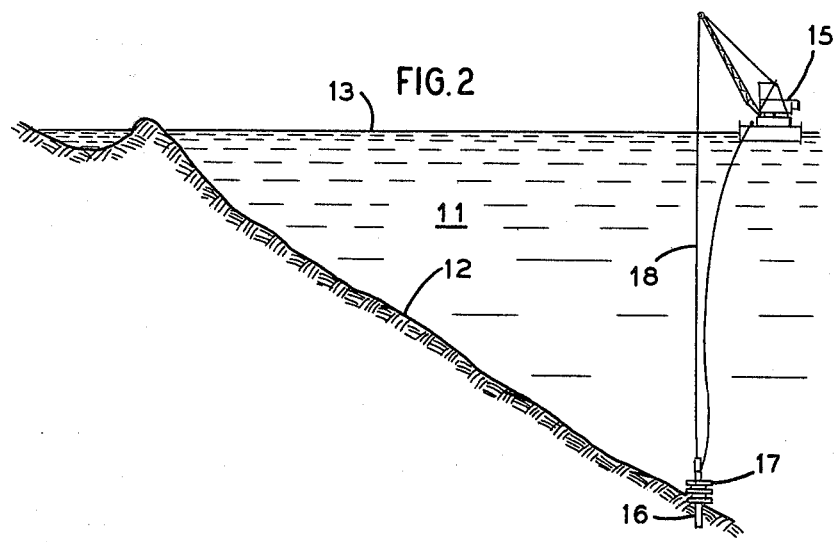
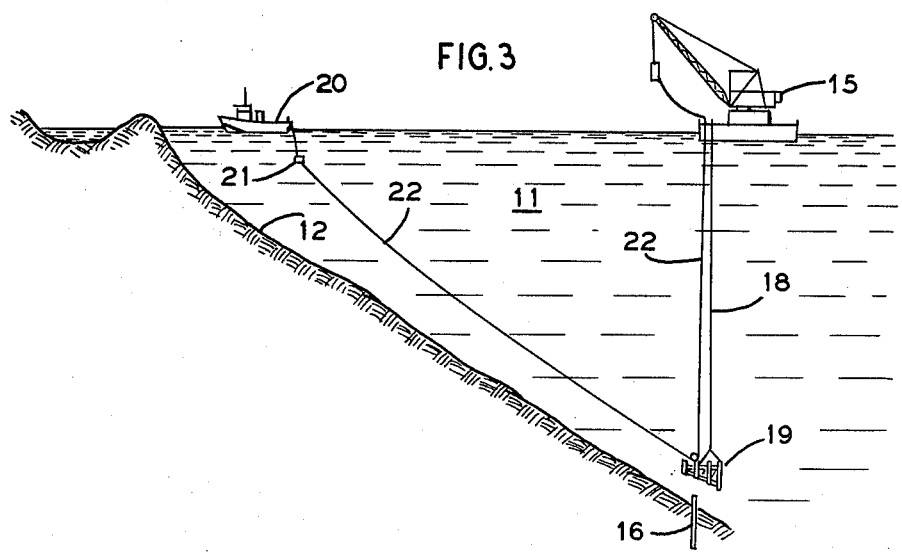

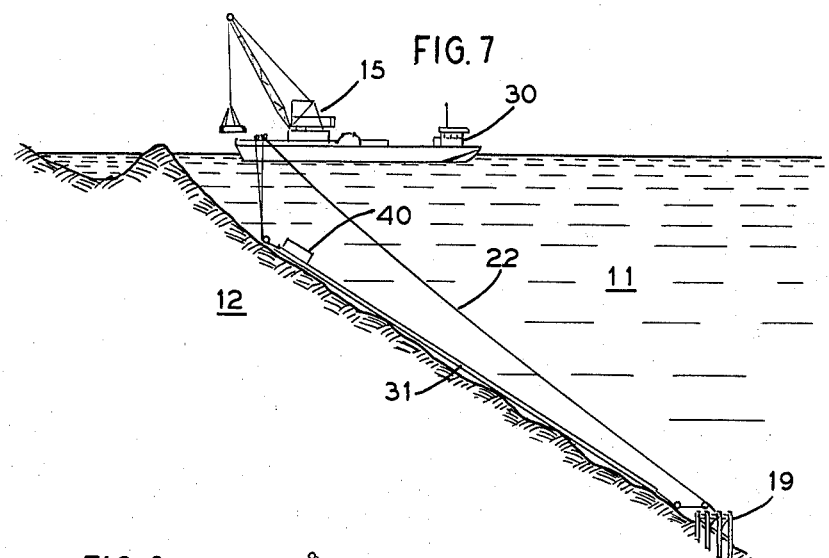
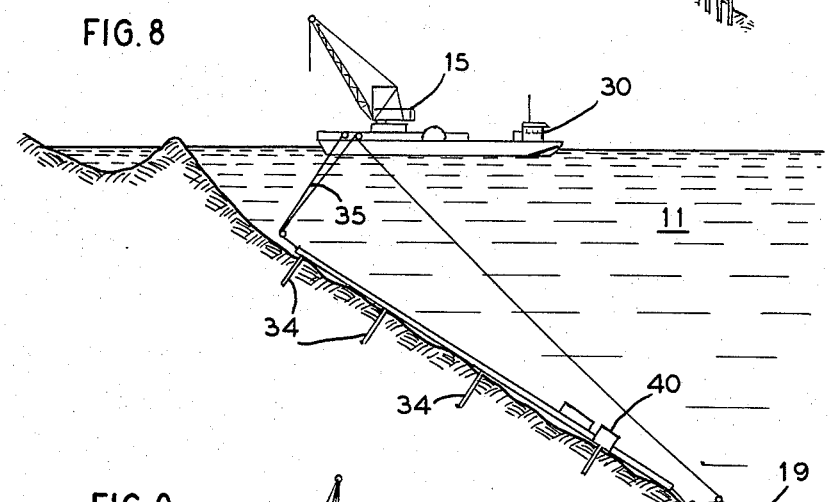
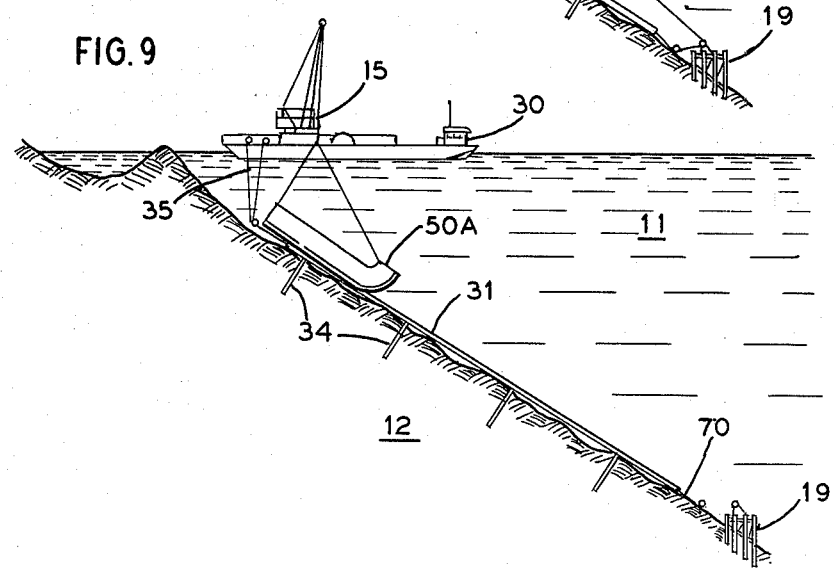

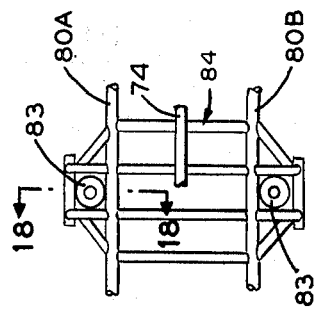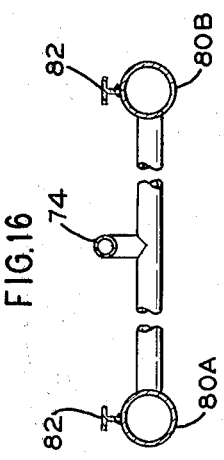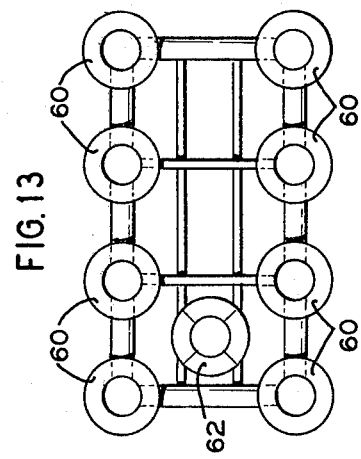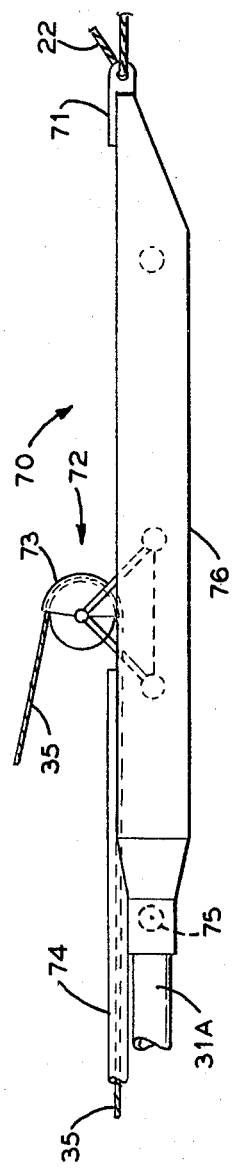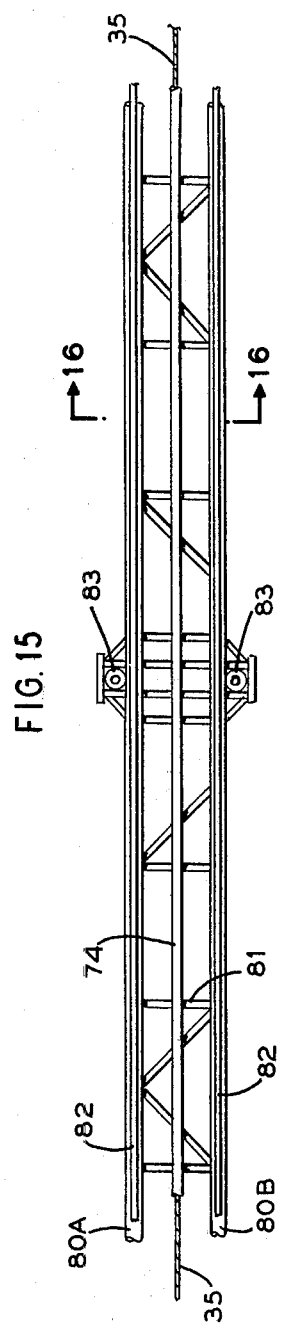

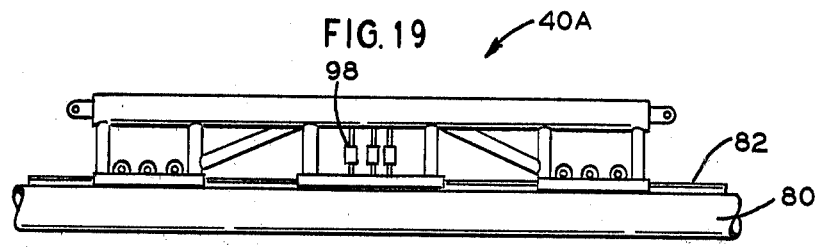
FIG. 19
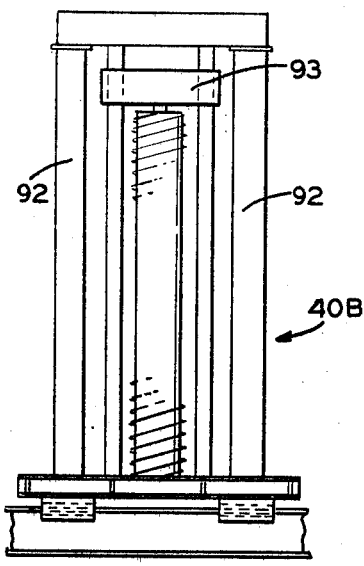
FIG. 20A
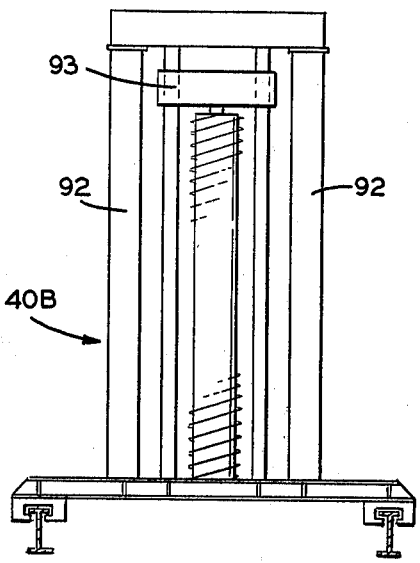
FIG. 20B
FIG. 18
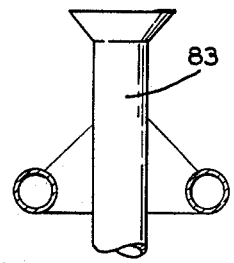

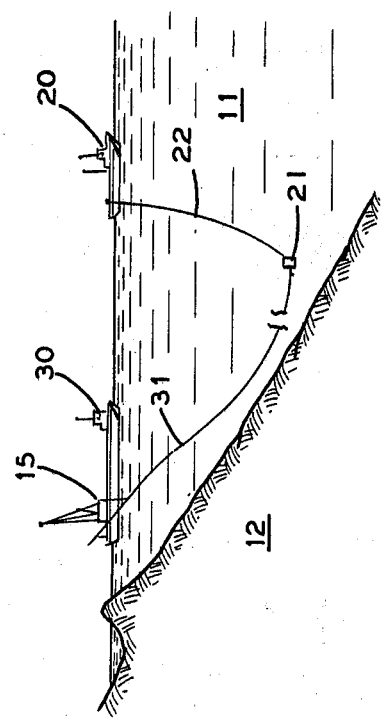
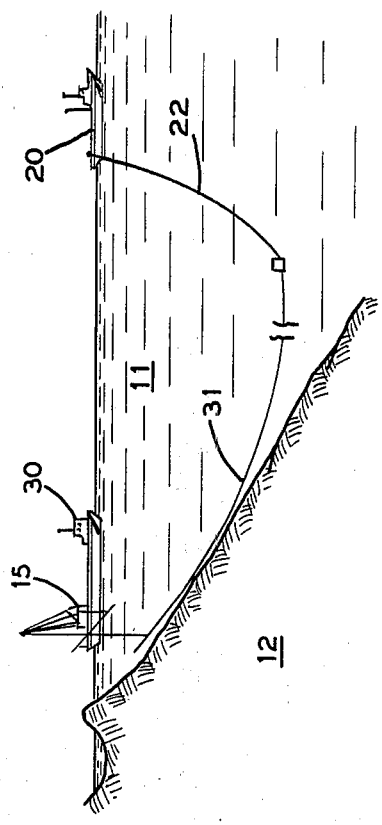
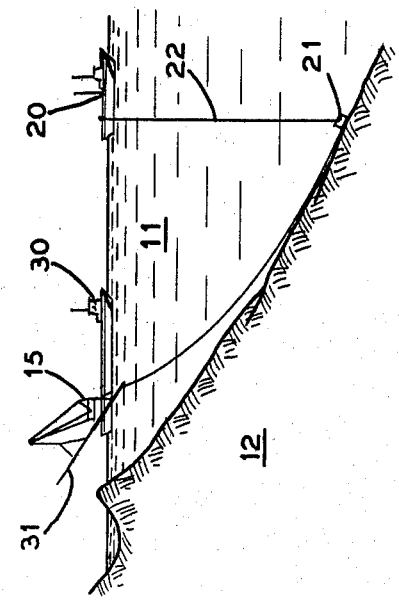
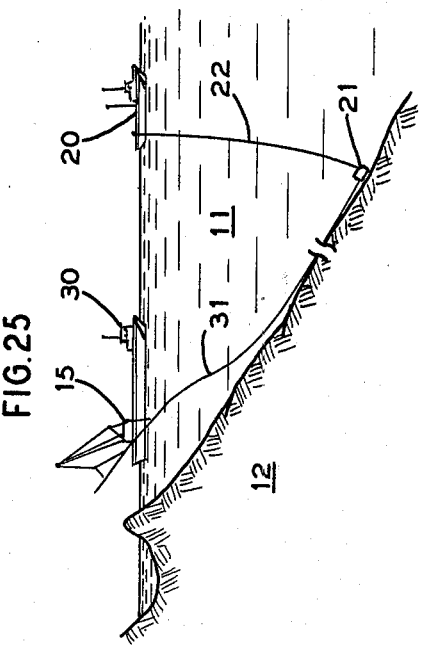

METHOD FOR INSTALLING SUBMARINE PIPELINES USING A MARINE RAILWAY SYSTEM

BACKGROUND OF THE INVENTION

1. Field of the Invention

The present invention relates to the installation of a cold water conduit on the floor of a continental shelf for use with Ocean Thermal Energy Conversion (OTEC) power plants. More particularly, the invention is concerned with the installation of larger than ever before installed cold water conduits being guided into place and secured to a marine railway system.

The high cost and dwindling supply of easily obtainable fossil fuels has created an intense interest in alternative sources of energy. One such alternative energy source involves the utilization of the temperature differential between the warm surface seawater and the subsurface seawater. This general concept is known as ocean thermal energy conversion or "OTEC".

In the operation of an OTEC power plant, warm surface seawater is used to vaporize a working fluid. The vapor is used to drive a turbine generator in much the same way steam is used to drive turbine generators, which ultimately produce electricity. After the vapor has passed through the turbines, cool subsurface seawater is used to condense the vapor, thereby completing the working fluid cycle. The cool subsurface seawater required for the process is located roughly 1500 to 3000 feet below the water surface depending on the latitude of the OTEC power plant. In the design of many OTEC power plants, it is necessary to pump large quantities of this cool subsurface seawater to the surface. To accomplish this it is envisioned that a long pipe commonly referred to as a "cold water conduit" will be used, said conduit to extend from the surface downward roughly 1500 to 3000 feet deep. It is anticipated that the cold water conduit must be approximately 5 to 120 feet in diameter for OTEC power plants from 1 to 400 MW respectively.

The need for such a huge conduit presents several severe problems. The conduit must be fabricated, installed, and secured so that it will be able to withstand the tremendous dynamic current loads. Other problems involve the method of installing such a large conduit and maintaining its position with respect to the OTEC plant located on the surface.

The present invention also minimizes the harm to the marine ecological system since it requires minimal disturbance of the ocean floor. All underwater operations can be monitored by the use of underwater cameras which miminizes the need for underwater personnel. The installation process proceeds from shallow waters thereby reducing the environmental forces on the work vessels and installation operation.

DESCRIPTION OF THE PRIOR ART

Prior art concerning the laying of pipeline on the ocean floor used methods of installation which encompassed the use of a barge and stinger arrangement or the use of an underwater sled which either placed the pipeline on or buried it in the ocean floor. In the past, structurally mounted pipelines were either used at shallow depths or were secured to the support structure above the water surface and then the support structure and the pipeline were jointly lowered to the ocean floor. Prior art has been able to lay pipelines measuring 16 inches in diameter to depths of 2000 ft., though some pipelines as large as 30 feet in diameter have been installed in shallow water. The use of a marine railway system to guide the pipeline to these depths and thereafter to support the pipeline on the railway system has heretofore never been attempted. Prior art has not been able to install pipelines at the depths necessary for use with an OTEC power plant, these depths were previously inaccessible by prior art means.

SUMMARY OF THE INVENTION

The invention is directed toward a method of installing a cold water conduit to be used in association with ocean thermal energy conversion systems and the like. The method involves installing and securing a marine railway system on the ocean floor extending from a depth of about 1500 to 3000 feet to an OTEC power plant located on a platform in several hundred feet of water, or built on the shoreline. Subsequently, marine railway is used for installing and securing a cold water conduit to the ocean floor.

The present invention is comprised of the steps of installing, leveling and securing at least one railway track system to the sloping floor of a body of water.

An object of this invention is the installation of a submarine pipeline to 3000 ft. water depths by remote methods and techniques which do not require underwater divers beyond 1300 ft. water depths.

Another object of this invention is the reduction of environmental forces, i.e., wind, current, waves, etc. on the installation operation and maintenance of the system.

Another object is the installation of a submarine pipeline at depths heretofore inaccessible.

A final object of this invention is the reduction of harm to the marine ecological system.

BRIEF DESCRIPTION OF THE DRAWINGS

FIG. 1 is an elevation view of the type of underwater land formation in which the invention is practiced.

FIG. 2 is an elevation view of the land formation shown in FIG. 1 showing the installation of the bench mark pile.

FIG. 3 is an elevation view of the land formation shown in FIG. 1 showing the installation of the deadman template.

FIG. 7 is an elevation view of the land formation shown in FIG. 1 with the track in place and the pile installation rig positioned thereon.

FIG. 8 is an elevation view of the land formation shown in FIG. 1 showing the step of securing and leveling the track to the land formation.

FIG. 9 is an elevation view of the land formation shown in FIG. 1 showing the step of lowering the first cold water conduit section onto the track.

FIG. 13 is the top view of deadman template.

FIG. 14 is the side elevation view of the down slope railway leader.

FIG. 15 is the top elevation view of the track section.

FIG. 16 is the end elevation view of a track section.

FIG. 17 is the detailed top elevation view of the track pile guide section.

FIG. 18 is a view taken along lines 18-18 in FIG. 17.

FIG. 19 is a side elevation view of the base of the rail mounted pile installation rig.

FIG. 20 is the front and side elevation view of the pile installation rig.

FIGS. 23-26 show an alternative method of positioning the track.

DESCRIPTION OF THE PREFERRED EMBODIMENT

Figure 4:
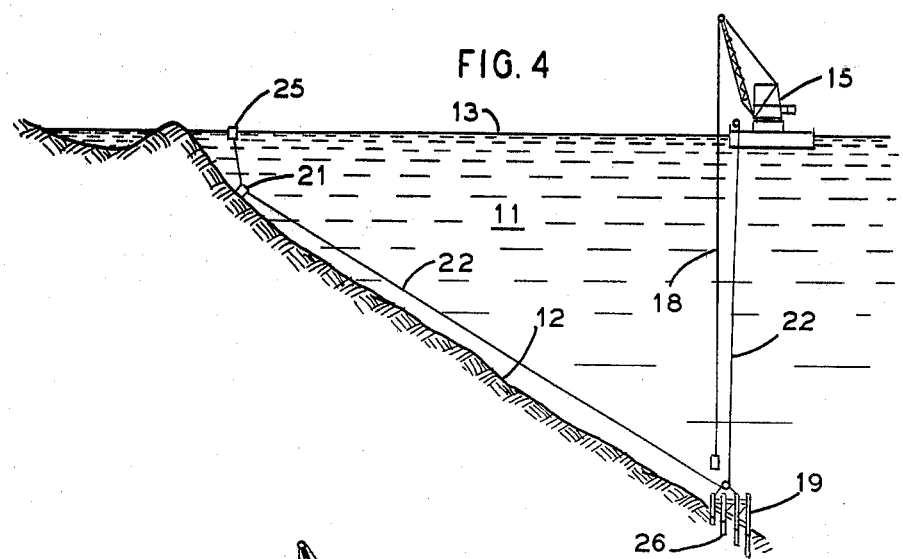
FIG. 4 is an elevation view of the land formation shown in FIG. 1 with deadman template and track pulldown cable in place.

Referring to FIG. 1, shown is a body of water 11 having a bottom 12 sloping downward and a surface 13 on which is floating a surveying vessel 14. Vessel 14 is outfitted with equipment well known in the art for obtaining accurate geotechnical and mapping data for purpose of locating the best site along which to install a marine railway system.

FIG. 2 shows derrick barge 15 installing a bench mark pile 16 using a pile driver 17 suspended by a cable 18. Before installation of the bench mark pile 16 to the bottom 12, the chosen path of the track may be cleared and/or leveled from the shoreline to the bench mark pile 16, in preparation for installing the marine railway system.

Figure 12:
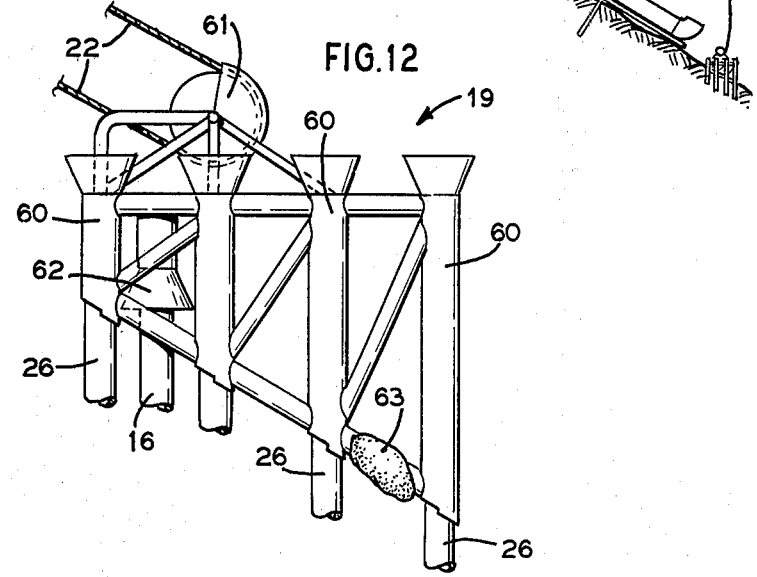
FIG. 12 is the side elevation view of deadman template.

FIGS. 3 and 4 show the installation of a deadman template 19 atop the bench mark pile 16. Template 19 is installed at approximately the depth to which a cold water conduit is to extend. As shown in FIGS. 12 and 13, template 19 has a plurality of pile guides or sleeves 60, one of which is inverted; this inverted pile guide 62 is slid over the bench mark pile 16. A second cable is threaded through a template pulley or sheave 61 (not shown in FIG. 13) before template 19 is lowered into the water 11.

Pulley 61 is attached to template 19 for the purpose of using it as an aide in the installation of a marine railway system. It allows derrick barge 15 to anchor and work in shallow water and yet install the railway system to the desired depth. An auxiliary vessel 20 is used to run cable 22, herein referred to as track pulldown cable 22, upslope of the template 19. An anchor 21 is attached to the end of the track pulldown cable 22 and float 25 is attached to anchor 21 or pulldown cable 22 for retrieval at a later time.

Thereafter, pile driver 17 installs the remaining template piles 26 needed to secure the template 19 to the sloping bottom 12. FIGS. 12 and 13 show template 19 having a number of template pile guides 60 and grout bags 63 attached thereto. Each template pile guide 60 receives a pile 26, driven into place by pile driver 17. After all piles, 16 and 26, are in place, and the template is leveled, the piles are secured to the template 19 by means well known in the art, preferably by pumping grout into the pile guides 60.

Figure 5:
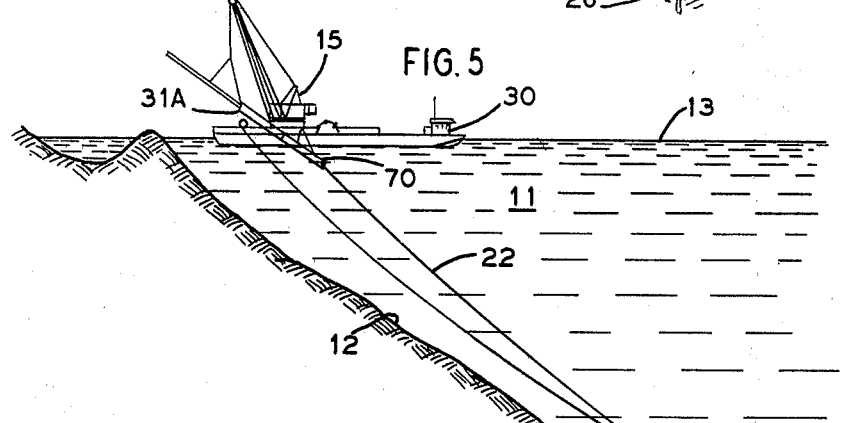
FIG. 5 is an elevation view of the land formation shown in FIG. 1 showing the step of attaching a track section to the downslope railway leader.
Figure 6:
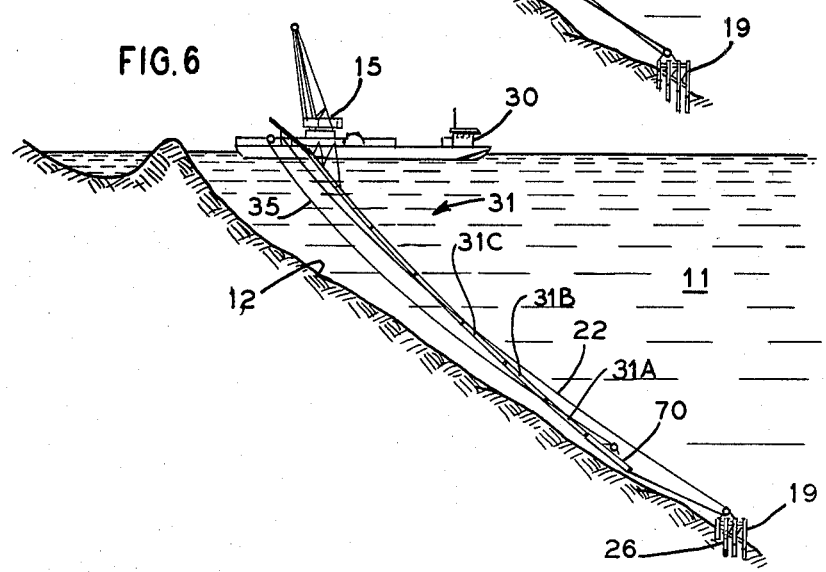
FIG. 6 is an elevation view of the land formation shown in FIG. 1 showing the step of lowering the track into position.

Referring to FIGS. 5 and 6, a track installation vessel 30 has been coupled with the derrick barge 15 and moved upslope of template 19. Track installation vessel 30 contains successive track sections which are designated 31A, B, C, etc. Those sections 41A, B, C, etc., once joined, comprise track 31. Track pulldown cable 22 has been retrieved and a down slope railway leader 70 has been releasably attached to cable 22. Derrick barge 15 is used to lift and position the railway leader 70 and the first track section 31A so that they may be secured together above the water's surface 13.

Note that it is not essential in the preferred embodiment of the invention to install template 19. The down slope railway leader 70 can be releasably attached to cable 22 which in turn is pulled out and away from the work vessels by an auxiliary vessel 20 and thereafter set on the bottom 12. This alternative method is shown in FIGS. 23 to 26 and is preferred when the path of track is smooth enough to permit its use.

Railway leader 70 is shown in FIG. 14. It includes a cable attachment means 71 to releasably attach track pulldown cable 22, a pulley or cold water conduit pulldown sheave 72 with guide 73, a cold water conduit pulldown cable 35 reeved therethrough, a cable conduit 74, track attachment means 75 for securing the leader 70 to the adjacent track section 31A, and a base 76 to which all the above is rigidly attached.

A typical track section 31A is shown in FIGS. 15 to 18 wherein there is shown conduits 80A and 80B (or any other similar shaped body having a length much greater than its width) on each side of the track section 31A, running the length of section 31A and defining its width. A plurality of supports 81 rigidly connect the two conduits 80A and 80B. A rail 82 in the shape of a T-section is rigidly connected along the top of each conduit 80A and 80B, or two parallel rails per track 31. The cable conduit 74 is positioned between the conduits 80A and 80B and runs the length of the track section 31A. Attached to each section 31A is a track pile guide section 84. Although there is shown only one track pile guide section 84 (FIG. 17), it is understood that any necessary and reasonable number could be used with any one track section 31A. Each track pile guide section 84 is shown to have two track pile guides 83.

Track sections 31A, B, C, etc. are successively attached as pulldown cables 22 is used to pull the joined track sections 31A, B, C, etc. towards template 19. Those sections 31A, B, C, etc. already joined define track 31 and can be flooded or pressurized as required to maintain the desired track attitude to avoid collapse due to the enormous external pressure exerted on closed bodies at great depths. Care must also be taken to feed out cable 35 while pulling the track 31 with pulldown cable 22. In the event of bad weather, the assembled track 31 can be set on the bottom until conditions improve. Once the whole track has been tacked together and threaded with cable 35, then cable 22 is used to pull the track 31 and railway leader 70 toward template 19. At this point in the installation process pulldown cable 22 extends from track installation barge 30 to the template sheave 61 and its one end is attached to the down slope railway leader 70 at cable attachment means 71. Cold waer conduit pulldown cable 35 extends from the track installation barge 30 to the cold water pulldown sheave 72 and through cable conduit 74 and after exiting the upslope end of the conduit 74 it extends back to one of the work barges 15 or 30.

Referring generally to FIGS. 7 and 8, shown is a pile installation rig 40 attached to cable 35 and thereafter lowered unto track 31 from derrick barge 15. FIGS. 19 and 20 show that the pile installation rig 40 is positioned on track 31 so that it rests on and is slidably engaged by rails 82. Rig 40 has a base 40A and a guide and reaction member 40B. The base 40A is a dolly-like member that is rail guided, and on which surface-activated brakes 98, of the type well known, are mounted. The guide and reaction member 40B is attached to the base 40A and is composed of supports 92 and a torque motor 93 used to screw in piles through the guide tubes 83, however, depending on soil conditions, a hammer may be mounted to drive the piles in. FIG. 9 shows the pile installation rig 40 proceeding down the railway track 31 installing track piles 34 to grade. The track 31 is then leveled with jacks (not shown) which are attached to the pile installation rig 40. Thereafter each pile 34 (shown in FIG. 8) is secured to the pile sleeve or guide 83 in a manner well known in the art, preferably with the placement of grout in the guides 83 which secures the track 31 to the bottom 12.

Cable 35 is used to pull the pile installation rig 40 downslope to continue the installation of the track piles 34 until all necessary track piles 34 are installed. Upon completion, the pile installation rig 40 is retrieved by pulling it upslope to the track's upslope end, releasing it from the track 31 and hoisting it back aboard work vessel 15 or 30.

Figure 10:
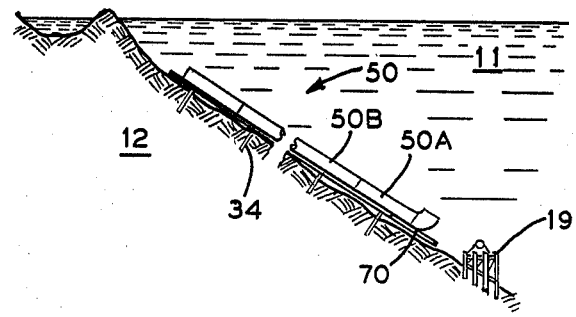
FIG. 10 is an elevation view of the land formation shown in FIG. 1 with the cold water conduit in position.

Referring to FIGS. 9 and 10, the track pulldown cable 22 has been released and pulled back to the derrick barge 15. The track installation barge 30 has been removed and materials barge 32 containing a first section 50A of the cold water conduit 50 (the inlet) is brought alongside derrick barge 15. The first section of cold water conduit 50A is releasably connected to conduit pulldown cable 35. Cable 35 is used to pull the conduit sections 50A, B, C, etc., into place once they have been lowered onto the track 31 and slidably engaged with rails 82. Mechanical brakes means (not shown) which are attached to each section of the cold water conduit 50A, B, C, etc. can be engaged from the surface and are used to secure each section of the cold water conduit 50 to the track 31 once in position. Cable 35 is then released from the cold water conduit 50. Brake means could be comprised of any of the following systems; an explosive pin, a mechanically driven wedge, or use of chemicals to create a metal to metal bond.

Figure 21:
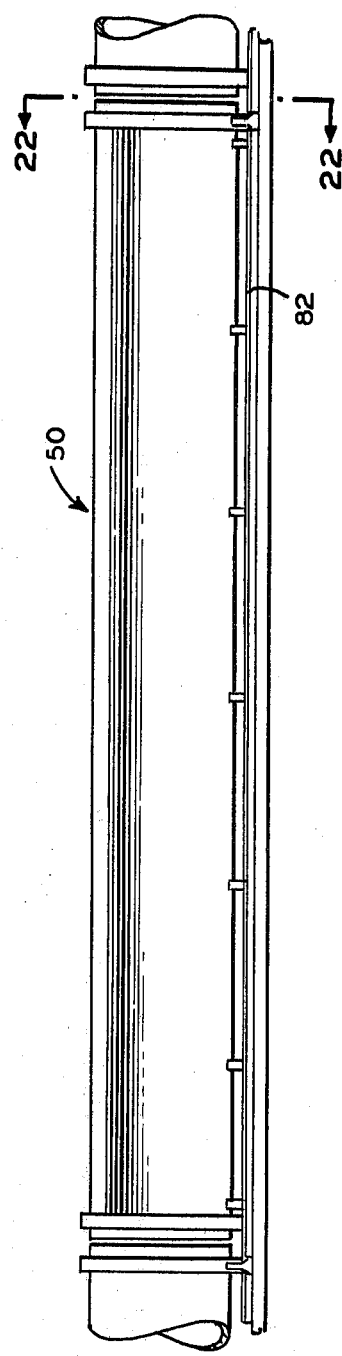
FIG. 21 is the side elevation view of a section of the cold water conduit.
Figure 22:
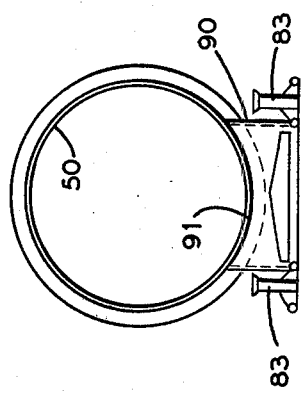
FIG. 22 is a view taken along lines 22—22 in FIG. 21.

As shown in FIGS. 21 and 22 each conduit section 50A, B, C, etc. has at least two saddle supports 90. Each saddle support 90 extends approximately the width of the track section 31 and has a concave top side 91 to which are mounted pads (not shown) upon which the cold water conduit 50 rests.

Figure 11:
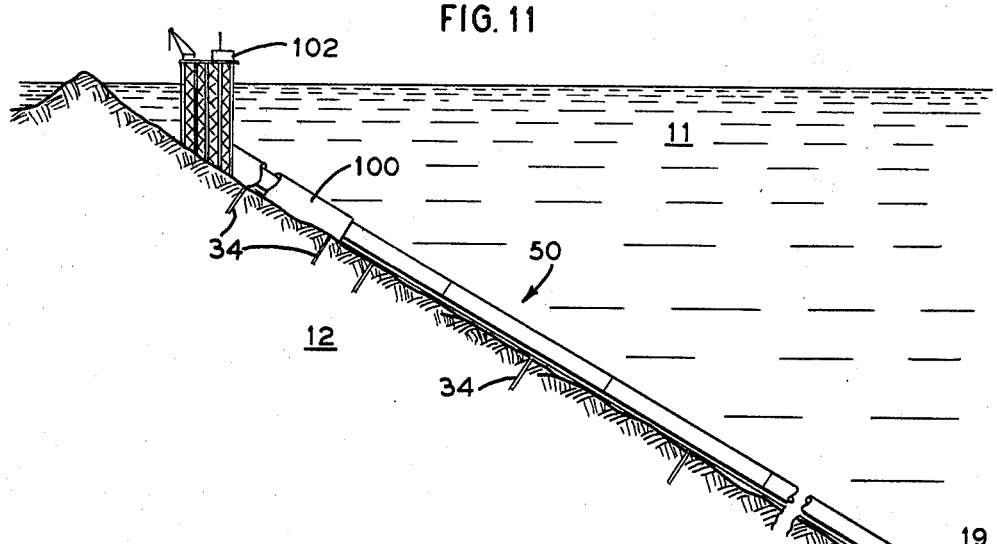
FIG. 11 is an elevation view of the completed cold water conduit of FIG. 10 in combination with a discharge pipe and OTEC power plant.

Cable 35 is a continuous loop cable which runs from derrick barge 15 through cable conduit 74 through cold water pulldown sheave 72 and then back to the derrick barge 15. Once the conduit section 50A is pulled into position, it is secured to the track 31, cable 35 is released from conduit inlet section 50A and the next section of conduit 50B is releasably attached thereto. Each successive section is lowered onto the track 31 and pulled into position by the cold water pulldown cable 35. FIG. 11 shows the completed installation of the cold water conduit 50, shown also is a discharge conduit 100 and a shelf mounted power plant 102 upon which the necessary pumps are located.

The embodiments of the invention in which an exclusive property or privilege is claimed are defined as follows:

1. A method of installing a submarine cold water conduit on the bottom of a body of water to an underwater land formation having an upslope and downslope area comprising the steps of:
   (a) attaching a railway leader to a track pulldown cable, the railway leader including a sheave through which is reeved a conduit pulldown cable,
   (b) rigidly fastening the railway leader and successive railway track sections to each other to construct a marine railway track means while simultaneously threading each track section with the conduit pulldown cable and pulling the track pulldown cable to control descent of the railway track sections,
   (c) lowering the track means onto the bottom,
   (d) securing the track means to the bottom,
   (e) releasably attaching the reeved conduit pulldown cable to a first section of the cold water conduit and pulling the first cold water conduit section into position on the track means using the reeved conduit pulldown cable,
   (f) securing the first cold water conduit section to the track means and repositioning the conduit pulldown cable for attaching to another section of the cold water conduit, and
   (g) repeating steps (e) and (f) for each successive cold water conduit section until all conduit sections are in place.

2. The method according to claim 1 further comprising the initial step of installing, leveling, and securing a deadman template to the downslope area of the bottom of water.

3. The method according to claim 2 wherein the step of installing, leveling, and securing the deadman template further comprises the steps of:
   (a) installing a bench mark pile,
   (b) placing the deadman template having a plurality of pile guides and a pulley reeved with the track pulldown cable atop the bench mark pile by slidably fitting a template pile guide over the bench mark pile,
   (c) installing a pile in each template pile guide,
   (d) leveling the template, and
   (e) securing the piles to the template.

4. The method according to claim 1 wherein the track pulldown cable is releasably attached.

5. The method according to claim 1 wherein each conduit section has at least one saddle support.

6. The method according to claim 1 wherein the railway track means is completely fabricated above water and thereafter installed and secured to the land formation.

7. A method of installing a submarine cold water conduit to a sloping underwater land formation comprising the steps of:
   (a) attaching a track pulldown cable to a railway leader which railway leader includes a sheave through which is reeved a conduit pulldown cable,
   (b) rigidily fastening the railway leader and successive railway track sections to each other to construct a railway track means while controlling descent of the railway track sections with the track pulldown cable, (c) lowering the railway track means onto the sloping underwater land formation, (d) securing the railway track means to the sloping underwater land formation, (e) releasably attaching the reeved conduit pulldown cable to a first section of the cold water conduit and operating the reeved conduit pulldown cable to pull the first cold water conduit section into position on the railway track means, (f) securing the first cold water conduit section to the railway track means and repositioning the conduit pulldown cable for attaching thereof to another section of the cold water conduit, and (g) repeating steps (e) and (f) for each successive cold water conduit section until all conduit sections are in place.

8. A method according to claim 7 further comprising the initial step of lowering and securing to the underwater land formation at the downslope area thereof a deadman template which includes a pulley reeved with the track pulldown cable.

9. A method according to claim 7 further comprising the step of threading each track section with the reeved conduit pulldown cable as the railway leader and track sections are fastened together.

10. A method according to claim 9 further comprising the initial step of lowering and securing to the underwater land formation at the downslope area thereof a deadman template which includes a pulley reeved with the track pulldown cable.

11. A method according to claim 10 wherein the track pulldown cable and the conduit pulldown cable are operated from a vessel on the surface of the water, the deadman template is installed from a vessel on the surface of the water, and the railway track means is fastened together above water.

* * * * *